US006179945B1

(12) United States Patent
Greenwood et al.

(10) Patent No.: US 6,179,945 B1
(45) Date of Patent: Jan. 30, 2001

(54) PROCESS FOR FILAMENT WINDING COMPOSITE WORKPIECES

(75) Inventors: Mark Edward Greenwood, Granville; James Vincent Gauchel; Jay Joseph Beckman, both of Newark, all of OH (US); Anthony Grenville Hankin, Cumbria (GB)

(73) Assignee: Owens Corning Fiberglas Technology, Inc., Summit, IL (US)

( * ) Notice: Under 35 U.S.C. 154(b), the term of this patent shall be extended for 0 days.

(21) Appl. No.: 09/223,704

(22) Filed: Dec. 30, 1998

(51) Int. Cl.$^7$ ................................................ B65H 81/00
(52) U.S. Cl. ............................................ 156/171; 156/169
(58) Field of Search ............................. 156/169, 171, 156/173, 175, 425; 118/420

(56) References Cited

U.S. PATENT DOCUMENTS

| | | |
|---|---|---|
| H1261 | 12/1993 | Gibson et al. . |
| 3,464,879 | 9/1969 | Poulsen . |
| 3,483,054 | 12/1969 | Bastone . |
| 3,556,888 | 1/1971 | Goldsworthy . |
| 3,655,489 | 4/1972 | Poulsen . |
| 3,679,521 | 7/1972 | Poulsen . |
| 3,770,541 * | 11/1973 | Gilbu ................................ 156/171 X |
| 3,827,397 | 8/1974 | Hebberling et al. . |
| 3,871,409 | 3/1975 | Gilbu . |
| 3,886,016 * | 5/1975 | Gilbu ................................ 156/171 |
| 3,886,029 | 5/1975 | Poulsen . |
| 3,947,305 | 3/1976 | Leroux et al. . |
| 3,964,522 | 6/1976 | Kao et al. . |
| 3,993,726 | 11/1976 | Moyer . |
| 4,145,740 | 3/1979 | McClean et al. . |
| 4,251,036 | 2/1981 | McLain . |
| 4,308,999 | 1/1982 | Carter . |
| 4,311,114 | 1/1982 | Lees et al. . |
| 4,541,887 | 9/1985 | Carter . |
| 4,561,306 | 12/1985 | Marino et al. . |
| 4,565,153 * | 1/1986 | Corley ............................... 118/420 X |
| 4,588,538 | 5/1986 | Chung et al. . |
| 4,907,754 | 3/1990 | Vaniglia . |
| 5,122,211 | 6/1992 | Roach . |
| 5,174,844 * | 12/1992 | Tong ..................................... 156/180 |
| 5,320,702 | 6/1994 | Matuschczyk et al. . |
| 5,324,377 | 6/1994 | Davies . |
| 5,364,489 | 11/1994 | Bailey et al. . |
| 5,454,870 | 10/1995 | Sieberth . |
| 5,462,619 | 10/1995 | Haworth et al. . |
| 5,503,928 | 4/1996 | Cheshire . |
| 5,626,643 | 5/1997 | Woodside et al. . |
| 5,747,075 | 5/1998 | Gauchel et al. . |
| 5,766,357 * | 6/1998 | Packer et al. ......................... 118/420 |
| 5,779,838 * | 7/1998 | Fellers et al. ..................... 156/169 X |
| 5,783,013 | 7/1998 | Beckman et al. . |

FOREIGN PATENT DOCUMENTS 508 393    10/1998    (SE) .

OTHER PUBLICATIONS

Beckman, J. et al, "Injection die meets ladder quality criteria", Modern Plastics International, 25, (1995) Jul., No. 7, pp. 69, 70, 72 and 76.*

Papers from an Owens Corning Brochure, Apr. 1996.

Papers from a Veroc Technology A–S Brochure, No Date.

* cited by examiner

*Primary Examiner*—Jeff H. Aftergut
(74) *Attorney, Agent, or Firm*—Inger H. Eckert

(57) ABSTRACT

A process and apparatus are provided for forming filament wound composite workpieces. The process comprises the steps of: providing reinforcement material; providing an injection die; providing a winding apparatus including a rotatable mandrel; passing the reinforcement material through the injection die; injecting a resin material into the injection die to impregnate the reinforcement material with the resin material to form impregnated reinforcement material; and winding the impregnated reinforcement material about the mandrel so as to form a composite workpiece.

10 Claims, 2 Drawing Sheets

US 6,179,945 B1

PROCESS FOR FILAMENT WINDING COMPOSITE WORKPIECES

TECHNICAL FIELD AND INDUSTRIAL APPLICABILITY OF THE INVENTION

This invention relates to a process and apparatus for filament winding composite workpieces and, more particularly, to such a process and apparatus wherein reinforcement material is impregnated in an injection die prior to being wound onto a mandrel.

BACKGROUND OF THE INVENTION

When making filament wound parts or workpieces, continuous fibers are conventionally wound onto a mandrel in predetermined geometric patterns using winding equipment. Creels hold the fibers and they are fed under tension. The mandrel may rotate or be passive. The orientation and thickness of the winding may be selected to match the direction and magnitude of loads in the final part or workpiece.

Typically high strength reinforcing or structural fibers such as fiberglass, e.g., E glass or S glass, and aramid, boron and carbon fibers, may be used when making filament wound parts or workpieces. The fibers are impregnated with a liquid resin, such as a polyester or an epoxy resin, via an impregnation bath or a roll applicator. The fibers are wetted before they are wound onto the mandrel. To obtain wetting, the fibers are typically drawn through an impregnation bath or passed over an applicator roll. Wetting and fill impregnation are difficult to achieve with these traditional methods. Further, these methods often result in air being trapped in the wetted reinforcement bundle. Even at slow speeds, these conventional wetting processes are only capable of wetting, impregnation and air removal of a limited number of strands. Hence, the rate of reinforcement material application which may be incorporated within filament wound parts is limited. Further, filament wound parts are made at relatively low rates due to the slow rate of wetting, making such parts expensive.

Resin baths are open or partially open to the atmosphere resulting in significant emissions into the atmosphere of environmentally unfriendly volatile organic compounds or VOC's. Further, significant resin waste commonly occurs with the use of open bath wet-out methods.

Voids are commonly found in filament wound parts which are caused by air becoming entrapped in the resin loaded onto the fibers as they pass through a resin bath or engage a roll applicator.

Hence, there is a need for an improved filament winding process and apparatus whereby: 1) higher application rates of glass reinforcement material can be wetted to reduce the time required to form a filament wound part; 2) filament wound parts can be formed with a higher reinforcement content; 3) voids in final workpieces can be reduced; 4) VOC emissions can be reduced; and 5) improved resin utilization occurs.

SUMMARY OF THE INVENTION

The present invention provides an improved process and apparatus for filament winding parts or workpieces. It involves passing reinforcement material, prior to being wound onto a mandrel, through a high pressure injection die wherein the reinforcement material is impregnated with resin material. The injection die is capable of increasing the rate of reinforcement application while providing complete impregnation of the reinforcement material. Further, reinforcement material packs having increased thicknesses and densities, which heretofore, were not used in filament winding processes, can now be used. Also, resin materials having high viscosities which if used in an impregnation bath would not have resulted in full impregnation within a reasonable time period, can now be used. The parts or workpieces formed by the process and apparatus of the present invention have a reduced number of voids. Further, fewer VOC's are released into the atmosphere since an open resin bath is not required.

In accordance with a first aspect of the present invention, a process is provided Or filament winding a composite workpiece. The process comprises the steps of: providing reinforcement material; providing an injection die; providing a winding apparatus including a rotatable mandrel; passing the reinforcement material through the injection die; injecting a resin material into the injection die to impregnate the reinforcement material with the resin material to form impregnated reinforcement material; and winding the impregnated reinforcement material about the mandrel so as to form a composite workpiece.

The reinforcement material may comprise continuous fibers alone or in combination with roll goods. The roll goods may comprise woven, non-woven and needle-punched fabrics, chopped strand mat, veil or a combination thereof.

In one embodiment, where the reinforcement material comprises continuous fibers in combination with roll goods, the continuous fibers are under a first tension as they pass through the injection die and are wound onto the mandrel, and the roll goods are under a second tension as they pass through the injection die and are wound onto the mandrel. The second tension is less than the first tension which allows the roll goods to be incorporated in a filament winding process.

The step of injecting a resin material into the injection die may comprise the step of injecting a single resin into the injection die. Alternatively, first and second resins may be injected into the injection die. The first resin may impregnate a lower portion of the reinforcement material and the second resin may impregnate an upper portion of the reinforcement material. The first resin may comprise a corrosion resistant resin while the second resin comprises a less costly resin. It is also contemplated that the first or the second resin system may include an abrasion resistant filler, an ultraviolet degradation inhibitor or other functional additives with features that are advantageous to a portion of the total laminate buildup.

In accordance with a second aspect of the present invention, an apparatus is provided for filament winding a composite workpiece. The apparatus comprises apparatus for supplying reinforcement material and an injection die through which the reinforcement material passes and into which resin material is injected. The resin material impregnates the reinforcement material. The apparatus further includes a winding apparatus positioned adjacent to the injection die. The winding apparatus includes a mandrel. The impregnated reinforcement material is wound about the mandrel so as to form a composite workpiece.

The supply apparatus includes a first tensioning device causing the continuous fibers to be supplied under a first tension and a second tensioning device causing the roll goods to be supplied under a second tension which is less than the first tension.

DETAILED DESCRIPTION AND PREFERRED EMBODIMENTS OF THE INVENTION

Figure 1:
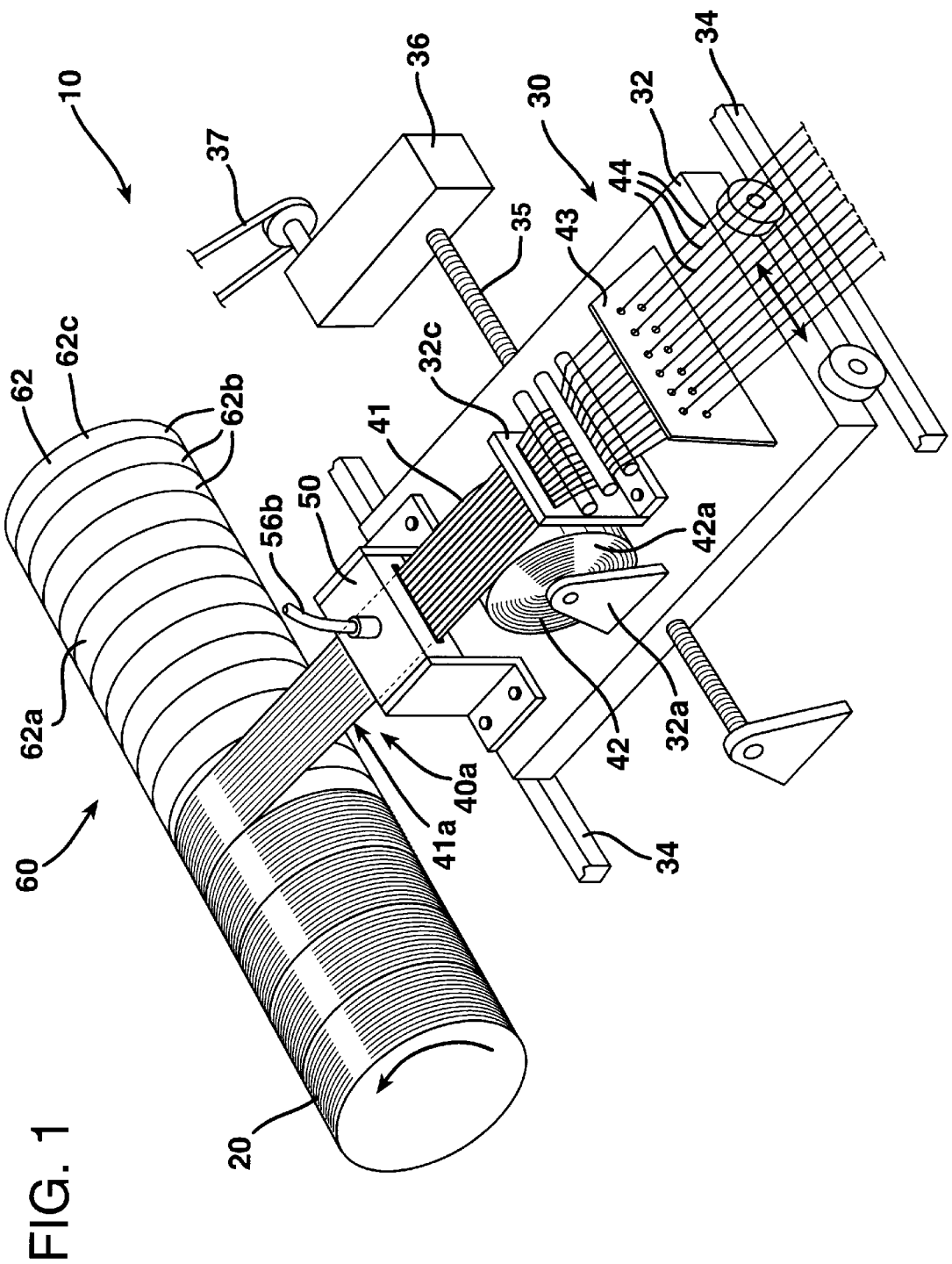
FIG. 1 is a perspective view of an apparatus constructed in accordance with the present invention.

An apparatus 10 for filament winding a composite workpiece 20 is illustrated in FIG. 1. It comprises apparatus 30 for supplying reinforcement material 40 and an injection die 50 through which the reinforcement material 40 passes and into which resin material is injected. The resin material impregnates the reinforcement material 40. The apparatus 10 further includes a winding apparatus 60 positioned adjacent to the injection die 50. The winding apparatus 60 includes a rotatable mandrel 62. The impregnated reinforcement material 40a is wound about the mandrel 62 so as to form the composite workpiece 20.

The rotatable mandrel 62 in the illustrated embodiment is a "continuous ribbon" type, such as disclosed in U.S. Pat. Nos. 3,464,879; 3,655,489; and 3,679,521, the disclosures of which are incorporated herein by reference. The mandrel 62 is defined by a continuously traveling steel band 62a supported upon an internal supporting structure (not shown) such that the band 62a moves continuously in a helical pattern from right to left as viewed in FIG. 1. The edges of successive laps 62b of the band 62a abut one another to define a continuous, cylindrical, helically traveling exterior mandrel surface 62c.

When a band portion reaches the end of the supporting structure, it is returned through the inner portion of the mandrel 62. The method of feeding the band 62a and the manner in which the return portions of the band 62a are placed and positioned to reconstitute the movable surface 62c are fully disclosed in the '879, '489, and '521 patents.

As the band 62a advances, it is preferably covered by a parting layer, not shown, such as a relatively inert plastic sheeting, e.g., MYLAR, in the form of a band which is wider than one of the band laps or widths 62b. The parting sheet is self-overlapping and provides a liquid tight cover for the mandrel 62, as well as providing a parting sheet for the subsequent separation from the mandrel surface 62c of the workpiece 20 built upon the mandrel 62.

Other commercially available winding apparatus 60 not specifically described herein may also be employed.

The supply apparatus 30, in the illustrated embodiment, comprises a carriage 32 which is capable of reciprocating back and forth along two rails 34. Alternatively, the carriage 32 may be stationary. Movement of the carriage 32 is effected by a screw 35 coupled to a gear box 36. The gear box 36, in turn, is coupled to a drive motor (not shown) via a belt 37. An operator, by controlling the operation of the drive motor and the gear box 36, can cause the carriage 32 to reciprocate along the rails 34 at any rate or can cause the carriage 32 to stop when this is desired.

The carriage 32 supports the reinforcement material 40, which may comprise roll goods 42, continuous fibers 44 or a combination of both. In the embodiment illustrated in FIG. 1, the carriage 32 includes a support 32a for a single roll 42a of roll goods 42. It further includes a guide eye board 43 for gathering multiple strands of continuous fibers 44 from creels (not shown). The fibers 44 may comprise reinforcing or structural fibers such as fiberglass, e.g., E glass or S glass, aramid, boron and/or carbon fibers. The fibers 44 may also comprise composite strands such as the commingled reinforcing and polymer fiber strands disclosed in U.S. Pat. No. 5,626,643, the disclosure of which is hereby incorporated by reference. It is also contemplated that the fibers 44 may comprise reinforcing fibers having a polymeric (thermosetting or thermoplastic) material coated thereon such as those disclosed in U.S. patent applications, Ser. No. 08/769,340 (now U.S. Pat. No. 5,972,503, issued Oct. 26, 1999) 08/695,909 and 08/695,504, the disclosures of which are incorporated herein by reference. The roll goods 42 may comprise a woven fabric, a non-woven fabric, a needle-punched fabric, a chopped strand mat, a continuous filament mat, a veil or any combination thereof. It is also contemplated that a thermoplastic material may be incorporated within the roll goods 42. For example, thermoplastic fibers, thermoplastic coated glass fibers or thermoplastic particulate powders may be incorporated within a mat or a fabric. In the embodiment illustrated in FIG. 1, the fibers 44 pass through a guiding and alignment device 32c and are then combined with a single layer of roll goods 42 to form a reinforcement pack 41 which passes into the injection die 50. It is also contemplated that the reinforcement pack 41 entering the die 50 may comprise only continuous fibers 44 or only roll goods 42. It is further contemplated that any number of roll good layers and any number of fiber layers may be used in forming the reinforcement pack 41.

The carriage 32 also supports the injection die 50. The injection die 50 may comprise any conventional injection die such as the one disclosed in U.S. Pat. No. 3,556,888 to Goldsworthy, the disclosure of which is hereby incorporated by reference. However, it is preferred that the injection die 50 comprise the die disclosed in U.S. Pat. No. 5,747,075 to Gauchel et al., the disclosure of which is hereby incorporated by reference.

The injection die 50 comprises an entry portion 52a, an internal passageway 52b and an exit portion 52c. The reinforcement pack 41 enters the die 50 through the entry portion 52a. It is pulled through the die 50 by the rotating mandrel 62. As the pack 41 passes through the internal passageway 52b of the die 50, it is infused and impregnated with a resin material. From the die 50, the impregnated pack 41a, which comprises the impregnated reinforcement material 40a, is wound about the mandrel 62 to form the workpiece 20.

Figure 2:
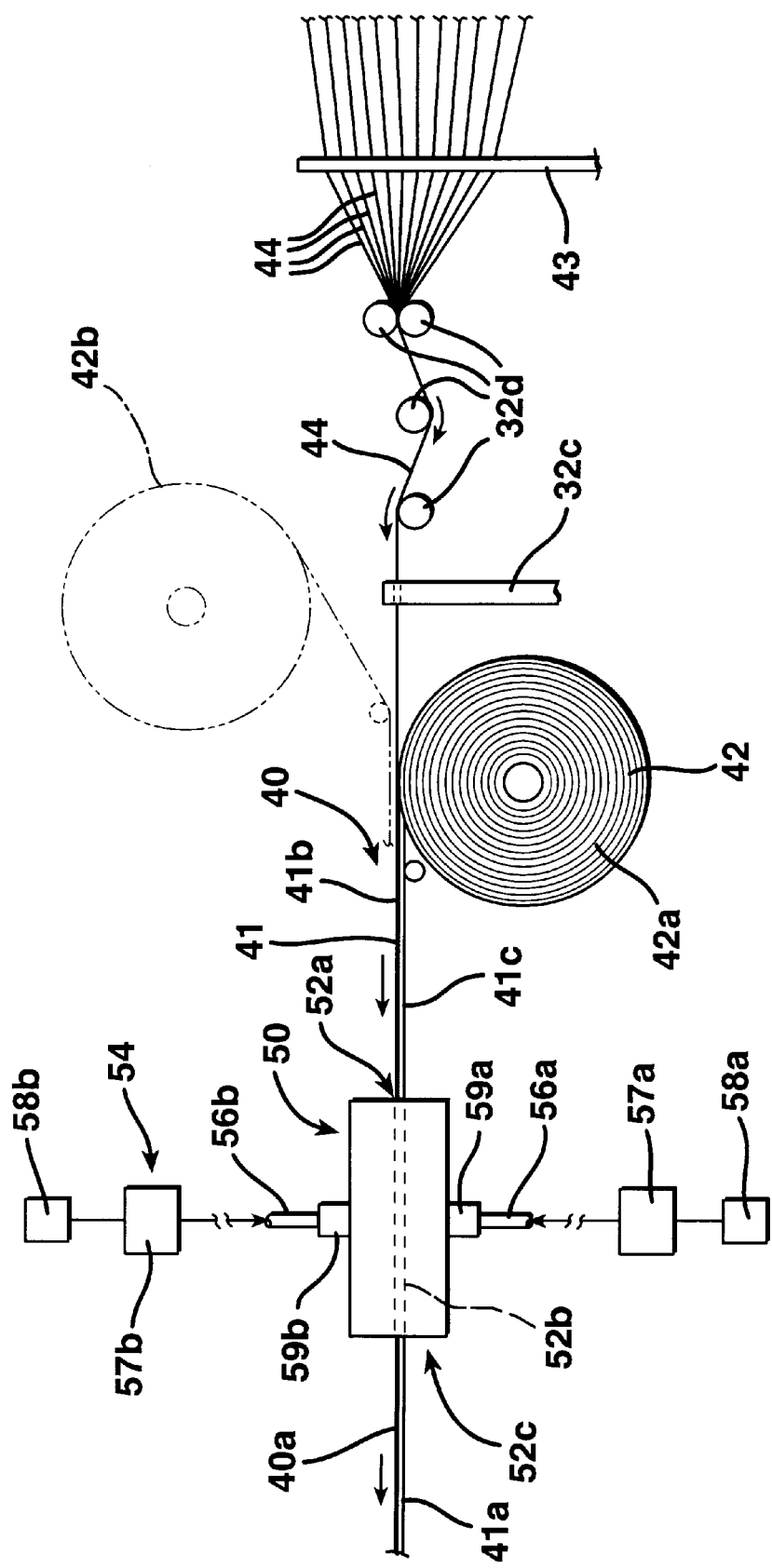
FIG. 2 is a side view of the apparatus illustrated in FIG. 1 with the mandrel, the carriage, the roll support and creels removed.

Resin supply apparatus 54 is provided for supplying resin material to the die 50, see FIG. 2. The supply apparatus 54 comprises first and second supply lines 56a and 56b, supply devices 57a and 57b and heaters 58a and 58b. Each of the supply devices 57a and 57b can comprise a conventional constant pressure pump. The resin system can be either a single resin composition injected into the die 50 through injection ports 59a and 59b or can comprise different multiple resin materials injected into the ports 59a and 59b. Thus, a first resin material can be injected into the port 59a to impregnate a lower portion 41c of the reinforcement pack 41 while a second resin material can be injected into the port 59b to impregnate an upper portion 41b of the reinforcement pack. The first resin material can comprise a corrosion resistant resin such as a vinyl ester, which is commercially available from Dow Chemical under the product designation D-411, or an impact resistant resin such as a urethane vinyl ester, which is commercially available from Dutch State Mining (DSM). The second resin material may comprise a less costly resin such as a polyester or an epoxy resin. The first and second resin materials may include an abrasion resistant filler such as sand or ceramic fillers, an ultraviolet degradation inhibitor such as Tinuvin P, which is commercially from Ciba Geigy, a pigment and/or a gel coat. The first and second resins may comprise other commercially available thermosetting resins such as isophthalic polyester, phthalic polyester, a phenolic resin, polyurethane or polyisocyanurate.

The die 50 is believed to be capable of impregnating reinforcement packs, such as very dense packs, which heretofore were not used in filament winding processes because complete impregnation could not be effected in a timely manner. Hence, the present apparatus 10 is capable of forming filament wound parts or workpieces having a high reinforcement content, for example, up to about 100 kg/m². Further, the present invention allows the reinforcement pack 41 to be more easily tailored for a desired product application as the pack 41 can comprise combinations of reinforcement materials previously not used in filament winding processes. Also, since the pack 41 is infused with resin under pressure, less air is trapped in the pack 41 resulting in fewer voids in the resulting filament wound workpiece. It is additionally noted that VOC's are reduced and resin utilization is improved as open resin baths are not required.

The carriage 32 further includes a plurality of tensioning bars 32d which engage the fibers 44 before they pass through the guiding and alignment device 32c and into the injection die 50. Hence, the bars 32d define a first tensioning device causing the continuous fibers 44 to be supplied under a first tension to the injection die 50 and the mandrel 62. The roll support 32a is also designed to create resistance to rotation such that it comprises a second tensioning device causing the roll goods 42 to be supplied under a second tension. Preferably, the first tension is greater than the second tension. The roll goods 42 may be damaged if supplied under too high of a tension.

The resulting workpiece can be built having between about 1 to about 20 layers of impregnated reinforcement material 40a. The impregnated reinforcement material 40a may also provide multiple layers when applied to the mandrel 60 by creating a reinforcement width greater than the advance rate of the mandrel 60 relative to the carriage 32.

An oven (not shown) may be provided to cure the resin in the wound workpiece 20 when a thermosetting resin is used. Further, a cutting device (not shown) may be provided to separate the workpiece 20 into desired lengths.

It is also contemplated that one or more injection dies (not shown) may be positioned above, below or to the side of the die 50. Each die receives a different portion of the reinforcement pack and impregnates that portion with one or more resin materials. The two or more pack portions may have different densities and constructions. The one or more resins provided to each die may be any one of the resins discussed above. It is further contemplated that two or more injection dies may be positioned in series with one another. Both dies may receive the same portion of the reinforcement pack.

It is additionally contemplated that the reinforcement pack may include an intermediate layer such as a foam layer or a highly filled intermediate layer such as a layer of aggregate such as sand, with a single particle size or blended particle sizes.

What is claimed:

1. A process for filament winding a composite workpiece comprising the steps of:

providing a reinforcement pack including roll goods;

providing at least one injection die having at least one internal passageway for receiving the reinforcement pack;

providing a winding apparatus including a mandrel;

passing said reinforcement pack through the internal passageway in said injection die;

injecting first and second nonidentical resins into said injection die to impregnate said reinforcement pack with said resins to form an impregnated reinforcement pack, said first resin impregnating a lower portion on of said reinforcement pack and said second resin impregnating an us portion of said reinforcement pack; and winding said impregnated reinforcement pack about said mandrel so as to form a composite workpiece.

2. The process as set forth in claim 1, wherein said step of providing reinforcement material comprises providing continuous fibers in combination with said roll goods.

3. The process as set forth in claim 2, wherein said roll goods comprise woven fabric, non-woven fabric, needle-punched fabric chopped strand mat, veil or a combination thereof.

4. The process as set forth in claim 2, wherein said continuous fibers are under a first tension as they pass through said injection die and are wound onto said mandrel and said roll goods are under a second tension as they pass through said injection die and are wound onto said mandrel, said second tension being less than said first tension.

5. The process as set forth in claim 1, wherein said first resin comprises a corrosion resistant resin.

6. The process as set forth in claim 1, wherein at least one of said first and second resins includes an abrasion resistant filler.

7. The process as set forth in claim 1, wherein said second resin includes an ultraviolet degradation inhibitor.

8. The process as set forth in claim 1, wherein said second resin includes a pigment.

9. The process as set forth in claim 1, wherein said second resin includes a gel coat.

10. A process for filament winding a composite workpiece comprising the steps of:

passing a reinforcement pack including at least one layer selected from the group consisting of a plurality of continuous fibers and roll goods through at least one injection die having at least one internal passageway;

injecting first a second non identical resins into said injection die to impregnate both a first side and a second opposite side of said reinforcement pack, said first resin impregnating a lower portion of said reinforcement pack and said second resin impregnating an upper portion of said reinforcement pack; and winding the impregnated reinforcement pack about a mandrel so as to form a composite workpiece.

* * * * *